US011057671B2

(12) United States Patent
Rycroft et al.

(10) Patent No.: US 11,057,671 B2
(45) Date of Patent: Jul. 6, 2021

(54) RENDERING A DYNAMIC LIGHT SCENE BASED ON AUDIO VISUAL CONTENT

(71) Applicant: SIGNIFY HOLDING B.V., Eindhoven (NL)

(72) Inventors: Simon Rycroft, Eindhoven (NL); Jonathan David Mason, Waalre (NL); Anthonie Hendrik Bergman, Nuenen (NL); Jacobus Dingenis Machiel Van Boven, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/643,676

(22) PCT Filed: Aug. 28, 2018

(86) PCT No.: PCT/EP2018/073110
§ 371 (c)(1),
(2) Date: Mar. 2, 2020

(87) PCT Pub. No.: WO2019/042986
PCT Pub. Date: Mar. 7, 2019

(65) Prior Publication Data
US 2020/0275152 A1 Aug. 27, 2020

(30) Foreign Application Priority Data

Sep. 1, 2017 (EP) .................................. 17189067
Dec. 8, 2017 (EP) .................................. 17206240

(51) Int. Cl.
*H04N 21/43* (2011.01)
*H04N 21/439* (2011.01)
(Continued)

(52) U.S. Cl.
CPC ..... *H04N 21/4394* (2013.01); *H04N 21/4131* (2013.01); *H04N 21/44008* (2013.01); *H04N 21/4854* (2013.01); *H05B 47/155* (2020.01)

(58) Field of Classification Search
None
See application file for complete search history.

(56) References Cited

U.S. PATENT DOCUMENTS

2006/0062424 A1 3/2006 Diederiks et al.
2009/0161030 A1 6/2009 Wang et al.
(Continued)

FOREIGN PATENT DOCUMENTS

| WO | 2004006570 A1 | 1/2004 | |
|---|---|---|---|
| WO | 2007113738 A1 | 10/2007 | |
| WO | WO-2007113738 A1 * | 10/2007 | ......... H04N 21/4394 |

*Primary Examiner* — Cai Y Chen (57) ABSTRACT

A method of controlling a connected lighting system based on audio-visual content. The method comprises automatically performing operations of: color extraction from an image comprised in video component of the audio-visual content, calculating an audio intensity level of an audio sample of the audio component of the audio-visual content, determining of a first target light color and a first audio intensity level based on the extracted color and the calculated audio intensity level; and controlling at least one lighting device according to the determined first target light color and the first audio intensity level. This method provides for control in a manner which increases immersion of a user experiencing the audio-visual content as being rendered by, for example a TV, through providing light effects by a connected lighting system.

13 Claims, 4 Drawing Sheets

(51) Int. Cl.
  *H05B 47/155* (2020.01)
  *H04N 21/41* (2011.01)
  *H04N 21/44* (2011.01)
  *H04N 21/485* (2011.01)

(56) References Cited

U.S. PATENT DOCUMENTS

| | | | |
|---|---|---|---|
| 2011/0205240 A1* | 8/2011 | Marks | H04N 5/2226 345/589 |
| 2015/0091473 A1 | 4/2015 | Clavenna, II et al. | |
| 2019/0166674 A1* | 5/2019 | Mason | H05B 47/155 |

* cited by examiner

RENDERING A DYNAMIC LIGHT SCENE BASED ON AUDIO VISUAL CONTENT

CROSS-REFERENCE TO PRIOR APPLICATIONS

This application is the U.S. National Phase application under 35 U.S.C. § 371 of International Application No. PCT/EP2018/073110, filed on Aug. 28, 2018, which claims the benefit of European Patent Application Numbers 17189067.6, filed on Sep. 1, 2017 and 17206240.8, filed on Dec. 8, 2017. These applications are hereby incorporated by reference herein.

TECHNICAL FIELD

The present disclosure relates to rendering a dynamic light scene based on audio-visual content.

BACKGROUND

WO2007/113738A1 discloses video-based ambient lighting data determining a color point and audio-based ambient lighting data determining a dim level of a light effect to be rendered.

US2009/161030A1 discloses controlling a light output based on RGB values of selected pixel points and adjusting flicker frequency of light emitted based on sound intensity.

Connected lighting systems may enable the rendering of a dynamic light scene, i.e. a light scene providing light output that changes over time. A dynamic light scene can create an ambience that is considered pleasant by a user. As an example, such a dynamic light scene may be predetermined and selectable by a user, such as a wake-up light scene in which lights slowly dim up to gently wake a user up. As a further example, such a dynamic light scene may be rendered based on an input value, such as an image, video or audio content.

Dynamic light scenes may provide a user an immersive experience by extracting colors from video content and rendering the extracted colors by a lighting device. In a similar manner, a dynamic light scene may enhance the experience of a user that is exposed to sound, such as a user listening to music. Light effects can, for example, be rendered based on a beat that is present in audio content.

It is desirable to provide a dynamic light scene that allows for deep immersion of a user into a rendering of audio-visual content.

SUMMARY

Users experience audio-visual content through both auditory and visual sensing. The auditory and visual experience are typically related. As a first example, when an explosion is part of audio-visual content the loudness of the audio may be directly related to how prominent the explosion is in the video. As a second example, the music score to e.g. a movie may indicate the intensity of a scene; such as loud music in an exciting movie scene.

According to a first aspect disclosed herein, there is provided a method of controlling a (wired or wireless) connected lighting system based on audio-visual content. The connected lighting system comprises one or more lighting devices. These one or more lighting devices may be controlled wirelessly using any wireless technology, such as ZigBee (Light Link) or Bluetooth (Mesh) or using a wired connection (e.g. DALI, DMX). The audio-visual content may, as an example, be a film or a music video; and comprises an audio component and a video component which are usually rendered synchronously by a rendering device such as a television, projector or other type of audio-visual equipment.

The method comprises automatically performing operations of: first color extraction, first audio intensity level calculation, determination of a first target light color and a first target light intensity level, based on the calculated first audio intensity level, and controlling at least one lighting device according to the determined first target light color and the first target light intensity level. The first color is extracted from an image comprised in a first segment of the audio-visual content. The first audio intensity level is calculated based on an audio sample comprised in this same first segment of the audio-visual content.

Audio-visual content, as mentioned, comprises an audio and video component. The video component, also called a video stream, comprises a plurality of individual images that may be rendered using audio-visual equipment to give the impression of a moving image. The video stream may be compressed using any known method, such as MPEG, and images may be interlaced, thus the word "image" should be interpreted broadly, it does not indicate that each image needs to be stored nor rendered individually in its entirety. The audio component, also called an audio stream, may also be compressed. Further, the audio steam may comprise multiple audio tracks, for example for providing surround sound or for separating audio related to background music, voice, commentary, etc. The word "audio sample" should be interpreted broadly, it does not indicate that all audio components (e.g. all audio tracks) of an audio stream need to be considered.

The first segment of the audio-visual content is a section, or (time) sample, of the video and audio stream. The first segment thus comprises one or more images of the video stream and the accompanying audio of the audio stream. As an example only, a segment may comprise a single image, or frame, of the video stream which is shown e.g. $1/24^{th}$ of a second (or $1/50^{th}$ or $1/60^{th}$ or any other time period, such as those known in various video formats) and the accompanying audio of the same duration. Alternatively, the segment may comprise multiple images and the accompanying audio. The color may then be extracted from a single image or from some or all of these multiple images. For example, the extraction may be performed by determining an average color value over multiple images.

The color that is extracted from the image may be the color value of a single pixel in the image, an average color value over a group of adjacent pixels or yet another color extraction method may be used.

The first audio intensity level may comprise a value indicating the (overall) loudness, or volume, of a sound sample; or of an abstraction of the sample, such as a frequency component. However, other indicators of an audio intensity level are not excluded. It is known that perceived loudness is related to the density of a sound sample; thus density is another example of a characteristic of the audio sample that may be used to determine the first audio intensity level.

Based on the extracted first color a first target light color is determined. These may be the same color. However, a lighting device may not be able to render the exact same color or certain colors may be avoided to provide a pleasing light effect. Thus, the first target light color may differ from the extracted first color. As an example only, a function may be applied to the first color to find the color which most contrasts this first color and this most contrasting color may be determined to be the first target light color.

Based on the calculated first audio intensity the first target light intensity level is determined. This relationship may be linear or non-linear; the latter allows, for example, to associate light effects with a low brightness levels to all but the loudest sounds. Further, the target light intensity level may be limited by capabilities of the one or more lighting devices in the connected lighting system. Thus, the first target light intensity level may be capped at a certain maximum (i.e. the lighting device cannot render light of a greater intensity at e.g. a specific color point) and/or minimum level (i.e. the lighting device cannot render light of a lower intensity as it does not support such deep dim levels).

At least one lighting device of the lighting system is controlled to emit a first light effect according to the determined first target light color and the determined first target light intensity level. Optionally, the determined first target light color and the determined first target light intensity level may be used to determine which lighting device, when there are multiple lighting devices, is used to render the light effect. When a light effect is to be rendered at an intensity that is greater than what a single lighting device can provide, the light effect may be rendered at multiple lighting devices.

Thus, the method advantageously provides a lighting experience that enhances the audio-visual content being rendered. As the colors rendered by the lighting system are based on colors extracted from the video stream, the visual effect is enhanced; i.e. a user is exposed to both the visual effect of the rendered video stream as well as the visual effect of the rendered light effect. Further, as the intensity of the light effects that are rendered are based on the audio intensity level of the audio content that is being rendered a more immersive experience is offered. The light effects are thus rendered by the connected lighting system alongside, e.g. in the same room, as wherein a user is exposed to the rendering of the audio-visual content.

A user may be provided with various degrees of control over the light effects that are rendered. For example, a user may set minimum, maximum or average intensities of light effects that are to be rendered. As another example, a user may control to what extent the light effect is controlled based on either the audio or video; thus, light intensity may be determined to a greater degree based on the light intensity of the video content and to a lesser degree based on the audio intensity level of the audio content; or vice versa. Such a selection which determines the degree of influence the video content and/or the audio content have on the light effects that are rendered may be provided using for example a slider. At one end of the slider the extent to which the light effects are controlled based on the audio content is maximized (and the extent to which the light effects are controlled based on the video content is minimized), while at the other end of the slider the extent to which the light effects are controlled based on the video content is maximized (and the extent to which the light effects are controlled based on the audio content is minimized). The default setting of this slider may be predetermined (e.g. audio and video content having an equal degree of influence on the light effects that are rendered) or can be dynamically adjusted based on a type of audio and/or video content that is rendered. As an example, the slider may be set at a preset position (and therefore the extent to which each of audio and video content determine the light effects that are rendered) based on whether a videogame is being played, a movie is being played, a music video is being played, etc. Even the type of videogame (e.g. first-person shooter vs. racing game) being played, the type of movie being played (e.g. children's animation vs. action film) or the type of music in the music video (e.g. jazz vs. classical music) being played may be used to determine a specific preset position.

A second color is extracted and a second audio intensity level is calculated for an audio sample of a second segment of the audio-visual content. This second color may be a different color from the first color. This second segment is subsequent to the first segment. For example, if the first segment comprises one or more images from the video stream, the second segment comprises one or more images that follow the first segment in time in the video stream. The second segment may be adjacent to the first segment, i.e. immediately follow the first segment, or not.

It is determined that the first audio intensity level exceeds an upper threshold audio intensity level and the method further comprises determining that the calculated second audio intensity level does not exceed this upper threshold audio intensity level. The second target light color is then determined based on the extracted second color, this may be performed in a manner similar to how the first target light color is determined based on the extracted first color. However, the second target light intensity level is now based on a predetermined intensity level. At least one lighting device of the lighting system is then controlled to emit a second light effect according to the determined second target light color and the determined second target light intensity level.

The predetermined intensity level is based on a time envelope function. Examples of a time envelope function are a decay function and an attack function. When the predetermined intensity level is based on a decay function, the decay function defines a light intensity level which decreases over time, for example from the first target light intensity level to a minimum light intensity level. This allows light effects to be rendered whereby a visually intense light effect is rendered when there is an intense sound and the light level then to decrease slowly, whereby new light effects are rendered at a light intensity level that follows this decay, or ramp down, of the initial intense light effect.

The envelope function defines a light intensity level which increases or decreases over time, for example increasing from the first target light intensity level to a higher (or maximum) light intensity level (i.e. an attack function), or decreasing from the first target light intensity level to a lower (or minimum) light intensity level (i.e. a decay function, as explained above). By changing the rate of attack and decay, light effects may be rendered in different ways. For example: by using a short attack and long decay time, visually intense light effects may be rendered when there is e.g. an intense sound; the light level can then be controlled to quickly increase toward the higher (or maximum) light intensity level and then slowly decreases toward a subsequent lower (or minimum) light intensity level, during or after which new light effects are also rendered at a light intensity level that follows this or another decay envelope function, or ramp up/down function. Time envelope functions are beneficial as they strongly increase the level of immersion that a user experiences when being exposed to such light effects accompanying audio-visual content, and at the same time smoothing the effect, thereby reducing distracting flicker caused by overly-dynamic light effects.

The minimum and/or maximum light intensity level of the envelope function (e.g. the decay and the attack function) may be determined, for example, based on an audio intensity level of an audio sample comprised in at least one segment of the audio-visual content preceding the first segment; or it may be user definable; or it may be determined based on a volume level at which the audio-visual content is rendered and/or based on a sensor signal indicative of an amount of movement of one or more users exposed to a rendering of the audio-visual content. The rate at which the light intensity level defined by the decay function decreases over time or defined by the attack function increases over time may be dependent upon the calculated second audio intensity level.

In another embodiment, the first target light intensity level is limited to a maximum light intensity level. The maximum light intensity level may, for example, be determined based on an audio intensity level of an audio sample comprised in at least one segment of the audio-visual content preceding the first segment, or it may be user definable.

In yet another embodiment, the first light effect comprises rendering the first target light color at a light intensity which increases, over time, from an initial light intensity to the determined first target intensity light level. Thus, the first light effect may comprise a ramp up, wherein the light output of the lighting device(s) rendering the light effect start of rendering the light effect at a lower light intensity level than the first target intensity level. This initial light intensity level may be the minimum light intensity level.

In a further embodiment, one or more of the at least one lighting device which is controlled to emit the first light effect is further controlled to emit the second light effect. Thus, the first light effect and the second light effect effectively share at least one lighting device, such that, for the one or more of the at least one lighting device, the first light effect is effectively replaced by the second light effect.

According to a second aspect there is provided a computer program product comprising code embodied on computer-readable storage, configured so as when run on one or more processing units to perform the operations according to the first aspect or any embodiment thereof.

According to a third aspect there is provided a controller for a connected lighting system comprising storage storing code and one or more processing units arranged to run said code, the code being configured so as when thus run to perform the operations according to the first aspect or any embodiment thereof.

According to another aspect disclosed herein, there is provided a system comprising said controller for a connected lighting system and the connected lighting system. According to another aspect disclosed herein there is provided a system comprising the controller for a connected lighting system and the audio-visual content rendering system. According to another aspect disclosed herein there is provided a system comprising the controller for a connected lighting system, the audio-visual rendering system and the connected lighting system.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
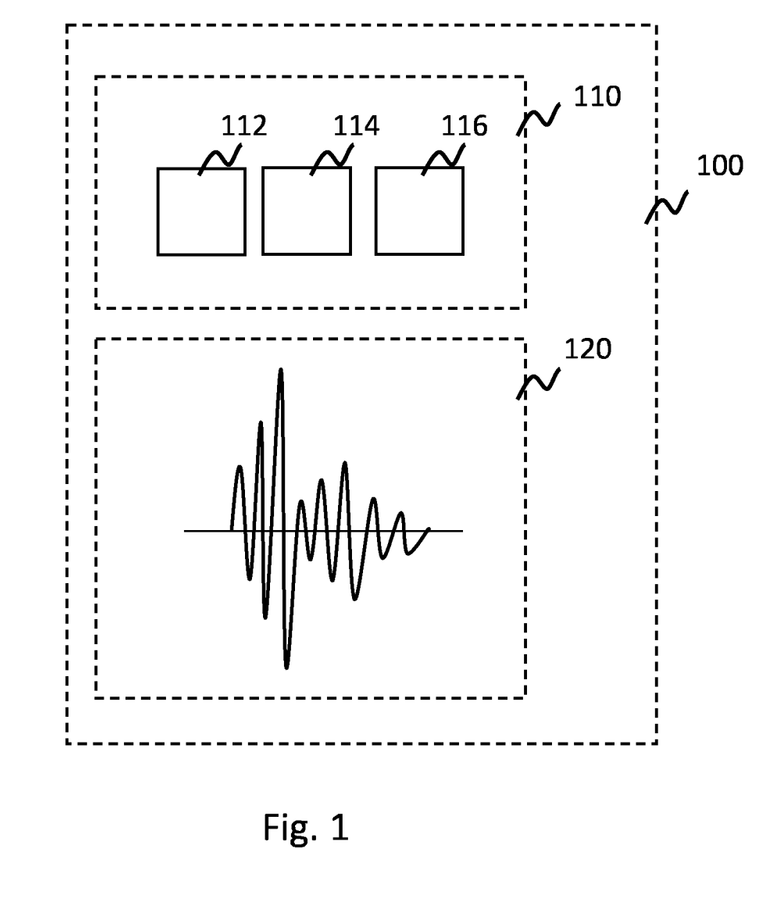
FIG. 1 is a schematic illustration of audio-visual content.

FIG. 1 shows a schematic illustration of audio-visual content 100, which comprises a video component 110 and an audio component 120. These two components may be rendered synchronously by audio video rendering equipment, such as a TV, such that a user is exposed to both component simultaneously. The video component comprises multiple images 112, 114, 116. The audio component 120 is illustrated here as a waveform, wherein multiple audio intensity level peaks are shown.

A connected lighting system (not shown) may render light effects to accompany the rendering of the audio-visual content. As an example, a single light effect may then be rendered based on extracting a single color from one of the images 112, 114, 116. As a further example, multiple light effects may be rendered simultaneously based on extracting multiple colors from one of the images 112, 114, 116 or by extracting one color or multiple colors of multiple of the images 112, 114, 116.

Continuing the examples provided, the color red may be extracted from the first image 112 and this color may be rendered by the connected lighting system. The brightness of the pixel value is typically used to determine at what intensity level (or in other words: brightness level, dim level) this extracted red color is to be rendered. However, according to the method disclosed herein the intensity level is determined based (at least partially or only) on the audio component 120.

Figure 2:
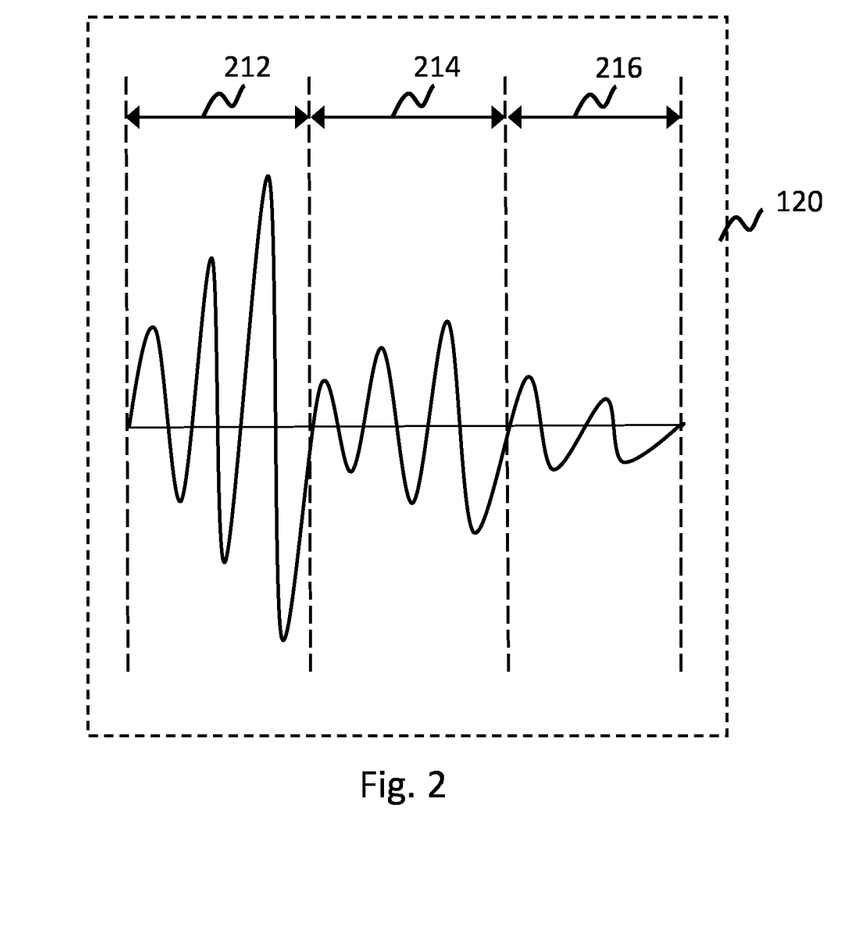
FIG. 2 is a schematic illustration of audio samples.

FIG. 2 shows a schematic illustration of the audio component 120 of FIG. 1. The audio component 120 comprises three segments 212, 214, 216. In this example, each segment is related to one of the images (i.e. audio segment 212 comprises an audio sample associated with image 112; audio segment 214 comprises an audio sample associated with image 114; audio segment 216 comprises an audio sample associated with image 116). The color extracted from the first image 112 may then be rendered at a light intensity level based on the audio intensity level calculated based on the associated audio segment 212. The color extracted from the second image 114 may then be rendered at a light intensity level based on the audio intensity level calculated based on the associated audio segment 214. The color extracted from the third image 116 may then be rendered at a light intensity level based on the audio intensity level calculated based on the associated audio segment 216.

The audio intensity level of a segment may, for example, be the average loudness of the segment. In this example, the first audio segment 212 would have the greatest audio intensity level and thus cause the color extracted from the image associated with this segment to be rendered at the greatest light intensity level.

Figure 3A:
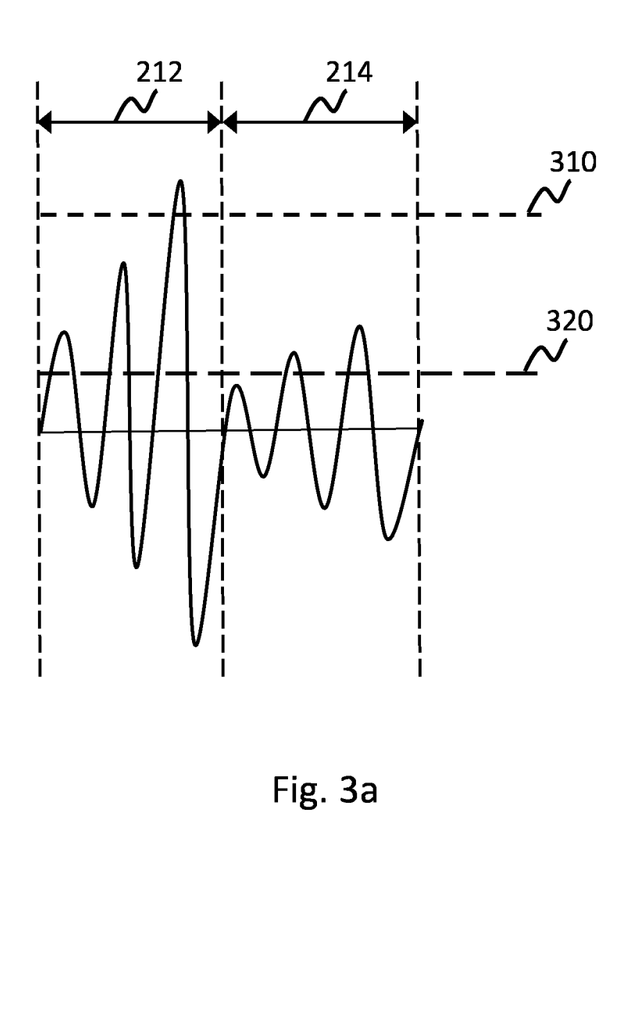
FIGS. 3a and 3b show schematic illustrations of audio samples indicating minimum and maximum levels, respectively, a schematic illustration of the associated light effect.

FIG. 3a shows a schematic illustration of some segments 212, 214 of the audio segments 212, 214, 216 of FIG. 2. Further a maximum level 310 and a minimum level 320 are shown. As an example, when there is a peak value above the maximum level 310 in an audio sample this may generate a light effect which triggers a decay function. Thus, a first light effect may be rendered based on there being a peak above the maximum level 310 in the first audio segment 212. This first light effect is shown, schematically, in FIG. 3b as first light effect 332. In this example, a first color is extracted from image 112 and this color is rendered at a first light level intensity 333, where (optionally, but shown here) the light effect comprises a ramp up to this first light intensity level 333.

Figure 3B:
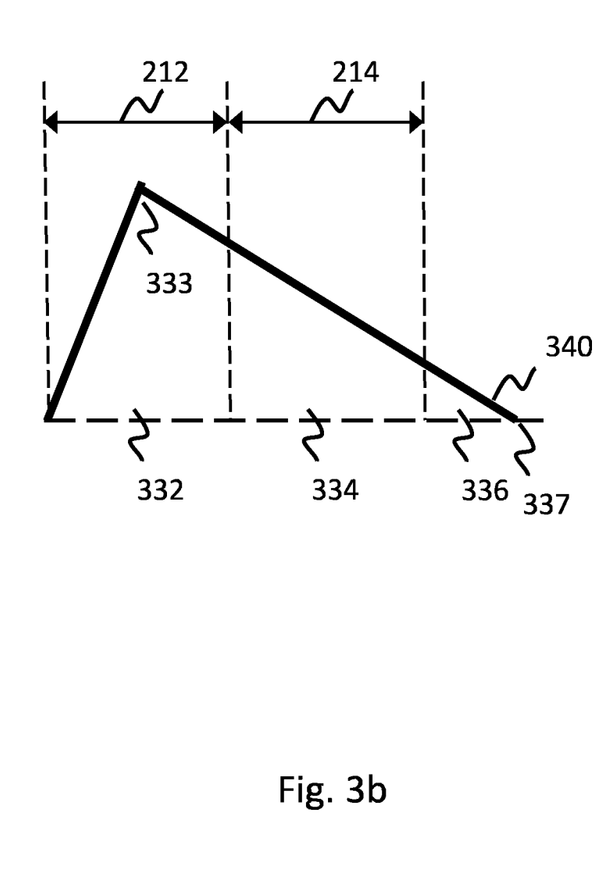

Further, a second color is extracted from the second image 114. As there is no peak value above the maximum level 310 in the second audio segment 214, this second color is rendered at a predetermined light intensity level. In this example, the predetermined light intensity level is determined according to a decay function and thus changes over time. The outcome of this function, i.e. the predetermined light intensity level, is shown in FIG. 3b as line 340. Although a linear decay from the first light intensity level 333 to a zero level is shown, this function need not be linear. The second light effect 334 is then rendered along side the rendering of the second segment 214. Thus, during a first time period alongside the rendering of the first segment of the audiovisual content by an audio-visual content rendering system, such as a TV, a lighting device of the connected lighting system renders the first color at an intensity level which ramps up from zero to the first light intensity level 333 and then decays according to a function, and the second color is then rendered by e.g. this same lighting device and the intensity level is still determined by aforementioned function.

There may be a minimum level 320 where audio segments which only comprise peaks which remain underneath this minimum level 320, do not result in a color being rendered. In the example shown, the second light effect 334 may then be extended such that the second color is rendered as a continuation 336 of this second light effect 334 until the predetermined light intensity level according to the decay function reaches zero 337.

Figure 4:
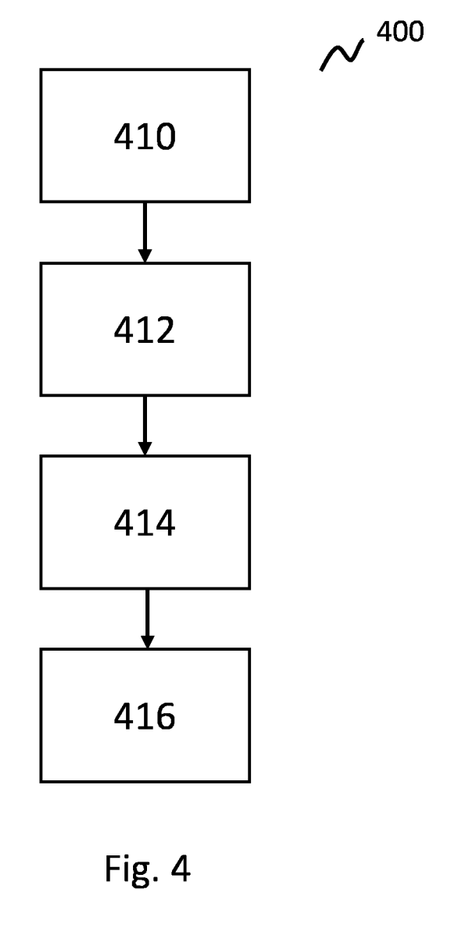
FIG. 4 is a schematic illustration of a method of controlling a connected lighting system.

FIG. 4 shows a schematic illustration of a method 400 of controlling a connected lighting system. The method 400 comprises automatically performing operations of: color extraction 410, first audio intensity level calculation 412, determination 414 of a first target light color and a first audio intensity level and controlling 416 at least one lighting device according to the determined first target light color and a first audio intensity level.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of controlling a connected lighting system, comprising one or more lighting devices, based on audio-visual content, the method comprising automatically performing operations of:
   extracting a first and second color from an image comprised in, respectively, a first and second segment of the audio-visual content, wherein the second segment is a segment of the audio-visual content subsequent to the first segment;
   calculating a first and second audio intensity level of an audio sample comprised in, respectively, the first and second segment of the audio-visual content;
   determining a first and second target light color, based on, respectively, the extracted first and second color;
   on the condition that the first audio intensity level exceeds and that the second audio intensity level does not exceed an upper threshold audio intensity level, performing the steps of:
   determining a first and second target light intensity level, based on, respectively, the calculated first audio intensity level and a predetermined intensity level;
   controlling at least one lighting device of the lighting system to emit a first light effect according to the determined first target light color and the determined first target light intensity level; and
   controlling at least one lighting device of the lighting system to emit a second light effect according to the determined second target light color and the determined second target light intensity level;
   wherein the predetermined intensity level is based on an envelope function comprising
   a decay function which defines a light intensity level decreasing over time from the first target light intensity level to a minimum light intensity level; or
   an attack function which defines a light intensity level increasing over time from the first target light intensity level to a maximum light intensity level.

2. The method of claim 1, the method further comprising: determining the minimum respectively maximum intensity level based on an audio intensity level of an audio sample comprised in at least one segment of the audio-visual content preceding the first segment.

3. The method of claim 1, wherein the minimum respectively maximum light intensity level is user definable.

4. The method of claim 1, wherein the minimum respectively maximum light intensity level is based on a volume level at which the audio-visual content is rendered and/or based on a sensor signal indicative of an amount of movement of one or more users exposed to a rendering of the audio-visual content.

5. The method of claim 1, wherein the rate at which the light intensity level defined by the decay or attack function decreases respectively increases over time is dependent upon the calculated second audio intensity level.

6. The method of claim 1, wherein the first target light intensity level is limited to a maximum light intensity level.

7. The method of claim 6, the method further comprising: determining the maximum light intensity level based on an audio intensity level of an audio sample comprised in at least one segment of the audio-visual content preceding the first segment.

8. The method of claim 6, wherein the maximum light intensity level is user definable.

9. The method of claim 1, wherein the first light effect comprises rendering the first target light color at a light intensity which increases, over time, from an initial light intensity to the determined first target intensity light level.

10. The method of claim 9, wherein the initial light intensity level is the minimum light intensity level.

11. The method of claim 1, wherein one or more of the at least one lighting device which is controlled to emit the first light effect is further controlled to emit the second light effect, such that, for the one or more of the at least one lighting device, the first light effect is effectively replaced by the second light effect.

12. A computer program product comprising code embodied on computer-readable storage, configured so as when run on one or more processing units to perform the operations of claim 1.

13. A controller for a connected lighting system comprising storage storing code and one or more processing units arranged to run said code, the code being configured so as when run to perform the operations of claim 1.

* * * * *